Patented Apr. 2, 1935

1,996,428

UNITED STATES PATENT OFFICE 1,996,428

MANUFACTURE OF SOLVENTS BY FERMENTATION

James F. Loughlin, Milwaukee, Wis.

No Drawing. Application September 21, 1931, Serial No. 564,150

3 Claims. (Cl. 260—135)

The invention relates to the manufacture of solvents by fermentation and has for one of its objects the production of valuable solvent materials by utilizing a residue of fermentable material which is present in beers that result from bacterial fermentations. Another object of the invention is to provide more economical methods of manufacturing said solvents by decreasing the various costs, such as the cost of steam and power.

In the production of solvents, such as butyl alcohol, acetone and/or isopropyl alcohol by fermentation of sugary or non-starch carbohydrate mashes, the bacteria may at times become practically inactive before all of the fermentable material is consumed. Heretofore, this residual fermentable material was commonly thrown away after the solvents were separated from the beer by distillation since the cost of recovery was large as compared to the value of the fermentable material. In practice the residue of sugary material constituted an almost worthless substance.

Because of the inhibiting effect on the bacteria of the products of fermentation, the concentration of the fermentable material in the mash was heretofore carefully regulated before inoculation and comparatively dilute solutions were used so that the largest proportions of fermentable material could be consumed before the solvents in the mash reached a concentration which would cause the bacteria to become inactive, but with this device about 30% to 40% of the fermentable substance was unfermented and large volumes of water had to be pumped, heated, cooled, and distilled.

The bacteria require carefully regulated conditions to avoid the presence of a substantial amount of dissolved oxygen and to avoid contamination. The use of yeast and bacteria simultaneously does not give good results since yeast thrives in the presence of oxygen and control of the bacterial fermentation is not possible. Likewise the bacteria referred to will not function properly in the presence of live yeast because the yeast promptly establishes a titratable acidity in the mash which is above the lethal point for the bacteria.

I have found that bacteria which ferment sugars and sugary non-starch carbohydrates, such as sucrose, maltose, levulose, dextrose, and various fermentable sugary materials which may occur as hydrolyzed products from starch, and produce solvents, such as butyl alcohol, acetone and/or isopropyl alcohol, will yield a beer having an acidity and a fermentable sugar content which is favorable for the growth of yeast and for the production of ethyl alcohol by yeast. According to the invention, the mash containing the fermentable sugary material is sterilized, inoculated with the bacteria which produce the solvents, and fermented under conditions which substantially exclude dissolved oxygen from the mash at the optimum temperatures, say 30° to 40° C. When the action of the bacteria is practically completed, a culture of yeast is added to the beer. The mash may be agitated with sterile air to give a plentiful growth of yeast and thereafter the yeast is permitted to act on the residue of sugars to produce ethyl alcohol and carbon dioxide gas.

The following specific embodiment of the invention is mentioned as an illustration. A mash was made by adding 9 kilos of Blackstrap cane molasses to 150 liters of water. About 45 grams of glue were added as nutrient. The mash was sterilized by boiling about 60 minutes, cooled to 36° C. and inoculated by adding an active culture of Clostridium Saccharobutyl-acetonicum, the volume of the inoculum being about 2⅓% of the volume of the mash. Clostridium Saccharobutyl-acetonicum is a butyl organism with characteristics which are described in detail in my co-pending application, Serial No. 555,531. The mash was maintained at about 36° C. and at the end of 80 hours the fermentation had practically ceased.

The titratable acidity of the beer was equivalent to about 1.4 cubic centimeters to 2.4 cubic centimeters of tenth normal alkali per 10 cubic centimeters of the beer. The beer was then inoculated with an active yeast culture, and agitated by blowing in sterile air near the bottom of the fermenter for about twenty minutes to give a good growth of yeast. During and after the blowing, the temperature of the beer was permitted to fall to about 30° C. This temperature was thereafter maintained for about two days until the alcoholic fermentation practically ceased.

The acetone, butyl alcohol and ethyl alcohol, which were produced by the successive fermentations, were recovered from the beer by distillation. Analysis showed that about 95% of the total sugars originally present in the mash were consumed. The yield of acetone, butyl alcohol and ethyl alcohol was about 37% of the total original weight of sugar mashed.

The bacteria which ferment sugars and produce butyl alcohol, acetone and/or isopropyl alcohol sometimes act abnormally and do not give the expected sugar consumption and yield of solvents. In accordance with the invention, yeast is used to ferment the residue of fermentable sugars in these batches. Good yields of ethyl alcohol and good sugar consumptions are obtained.

It has been found that yeast is not deleteriously affected by the acetone, butyl alcohol or isopropyl alcohol produced by the bacteria that are capable of producing these solvents by fermentation, and the acid concentration of the beers produced by these bacteria are favorable for yeast fermentations. Excellent fermentations by yeast are produced even with the highest concentrations of the products of the bacterial fermentation. Temperatures of about 20° C. to 35° C. are favorable for the action of the yeast.

A wide variation in the content of fermentable sugars in the mashes can be used. All of the fermentable sugars which the bacteria and the yeast are capable of consuming can be advantageously added to the mash at the start, thereby providing a mash with a high concentration of fermentable carbohydrate and requiring a very low expenditure of power for pumping the mash and of steam for heating, sterilization and distillation. It is likewise advantageous when high yields of ethyl alcohol are desired to increase the content of fermentable material in the mash by adding fermentable sugars after the fermentation by the bacteria is completed.

The term sugary in the specification and claims refers to sugars and to the sugary non-starch carbohydrate substances which are fermentable by the action of bacteria and produce butyl alcohol, acetone and/or isopropyl alcohol; and the term butyl organism refers to bacteria which produce butyl alcohol, acetone and/or isopropyl alcohol by the fermentation of sugary mashes.

Although the invention has been specifically described with reference to the use of a pure culture of only one organism, it is evident that other and mixed solvent-producing cultures of organisms can be used. No limitations are intended in the annexed claims except those which are specifically mentioned or imposed by the prior art.

I claim:

1. The method of fermenting sugar containing mash which comprises successively fermenting the mash first by the action of Clostridium Saccharobutyl-acetonicum and then by the action of yeast.

2. The method of producing acetone, butyl alcohol, and ethyl alcohol which comprises making a mash which contains sugary material, inoculating with a culture of Clostridium Saccharobutyl-acetonicum, fermenting at temperatures of 30° to 40° C. until the fermentation by the butyl organism is practically completed, and then inoculating the beer with a yeast culture, and fermenting by the action of the yeast in the presence of the bacteria.

3. The method of producing acetone, butyl alcohol and ethyl alcohol which comprises making a sterilized molasses mash, inoculating and fermenting the mash at temperatures of about 36° C. with a culture of Clostridium Saccharobutyl-acetonicum to produce acetone and butyl alcohol, and then inoculating with a yeast culture, and fermenting in the presence of the bacteria at temperatures of about 20° to about 35° C. to produce alcohol.

JAMES F. LOUGHLIN.